United States Patent
Bar-Or Tillinger et al.

(10) Patent No.: US 11,916,702 B2
(45) Date of Patent: Feb. 27, 2024

(54) TONE RESERVATION FOR DIGITAL POST DISTORTION

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/645,278

(22) Filed: Dec. 20, 2021

(65) Prior Publication Data
US 2023/0198809 A1   Jun. 22, 2023

(51) Int. Cl.
*H04L 25/02*   (2006.01)
*H04L 5/00*   (2006.01)

(52) U.S. Cl.
CPC ........ *H04L 25/0204* (2013.01); *H04L 5/0007* (2013.01); *H04L 25/022* (2013.01); *H04L 25/0228* (2013.01)

(58) Field of Classification Search
CPC ............. H04L 27/2614; H04L 27/2615; H04L 27/2618; H04L 27/262; H04L 25/0206; H04L 5/0007; H04L 25/022; H04L 25/0228
See application file for complete search history.

(56) References Cited

U.S. PATENT DOCUMENTS

| | | | |
|---|---|---|---|
| 8,014,264 B2* | 9/2011 | Li | H04L 5/0055 370/280 |
| 2007/0037528 A1* | 2/2007 | Doan | H04B 7/0615 455/562.1 |
| 2007/0242598 A1* | 10/2007 | Kowalski | H04L 27/2618 370/206 |
| 2010/0067615 A1* | 3/2010 | Dorpinghaus | H04L 27/2618 375/295 |
| 2010/0124296 A1* | 5/2010 | Rajagopal | H04L 27/2618 375/260 |
| 2012/0269302 A1* | 10/2012 | Ancora | H04L 25/03006 375/340 |
| 2016/0218905 A1* | 7/2016 | Roh | H04B 7/0456 |
| 2022/0132482 A1* | 4/2022 | Gokceli | H04W 72/044 |

* cited by examiner

*Primary Examiner* — Sophia Vlahos
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station having one or more antenna ports, a communication that includes one or more data streams and a tone reservation signal, wherein a number of the one or more antenna ports is different than a number of the one or more data streams. The UE may perform channel estimation based at least in part on the communication. Numerous other aspects are described.

30 Claims, 9 Drawing Sheets

TONE RESERVATION FOR DIGITAL POST DISTORTION

FIELD OF THE DISCLOSURE

Aspects of the present disclosure generally relate to wireless communication and to techniques and apparatuses for tone reservation for digital post distortion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station having one or more antenna ports, a communication that includes one or more data streams and a tone reservation signal, wherein a number of the one or more antenna ports is different than a number of the one or more data streams. The method may include performing channel estimation based at least in part on the communication.

Some aspects described herein relate to a method of wireless communication performed by a base station. The method may include identifying a tone reservation signal for one or more data streams. The method may include performing a transmission of a communication, using one or more antenna ports of the base station, that includes the one or more data streams and the tone reservation signal, wherein a number of the one or more antenna ports is different than a number of the one or more data streams.

Some aspects described herein relate to an apparatus for wireless communication performed by a UE. The apparatus may include a memory, a transceiver, and one or more processors, coupled to the memory and the transceiver. The one or more processors may be configured to receive, from a base station having one or more antenna ports, a communication that includes one or more data streams and a tone reservation signal, wherein a number of the one or more antenna ports is different than a number of the one or more data streams. The one or more processors may be configured to perform channel estimation based at least in part on the communication.

Some aspects described herein relate to an apparatus for wireless communication performed by a base station. The apparatus may include a memory and one or more processors, coupled to the memory. The one or more processors may be configured to identify a tone reservation signal for one or more data streams. The one or more processors may be configured to perform a transmission of a communication, using one or more antenna ports of the base station, that includes the one or more data streams and the tone reservation signal, wherein a number of the one or more antenna ports is different than a number of the one or more data streams.

Some aspects described herein relate to a non-transitory computer-readable medium that stores a set of instructions for wireless communication by a UE. The set of instructions, when executed by one or more processors of the UE, may cause the UE to receive, from a base station having one or more antenna ports, a communication that includes one or more data streams and a tone reservation signal, wherein a number of the one or more antenna ports is different than a number of the one or more data streams. The set of instructions, when executed by one or more processors of the UE, may cause the UE to perform channel estimation based at least in part on the communication.

Some aspects described herein relate to a non-transitory computer-readable medium that stores a set of instructions for wireless communication by a base station. The set of instructions, when executed by one or more processors of the base station, may cause the base station to identify a tone reservation signal for one or more data streams. The set of instructions, when executed by one or more processors of the base station, may cause the base station to perform a transmission of a communication, using one or more antenna ports of the base station, that includes the one or more data streams and the tone reservation signal, wherein a number of the one or more antenna ports is different than a number of the one or more data streams.

Some aspects described herein relate to an apparatus for wireless communication. The apparatus may include means for receiving, from a base station having one or more antenna ports, a communication that includes one or more data streams and a tone reservation signal, wherein a number of the one or more antenna ports is different than a number of the one or more data streams. The apparatus may include means for performing channel estimation based at least in part on the communication.

Some aspects described herein relate to an apparatus for wireless communication. The apparatus may include means for identifying a tone reservation signal for one or more data streams. The apparatus may include means for performing a transmission of a communication, using one or more antenna ports of the apparatus, that includes the one or more data streams and the tone reservation signal, wherein a number of the one or more antenna ports is different than a number of the one or more data streams.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
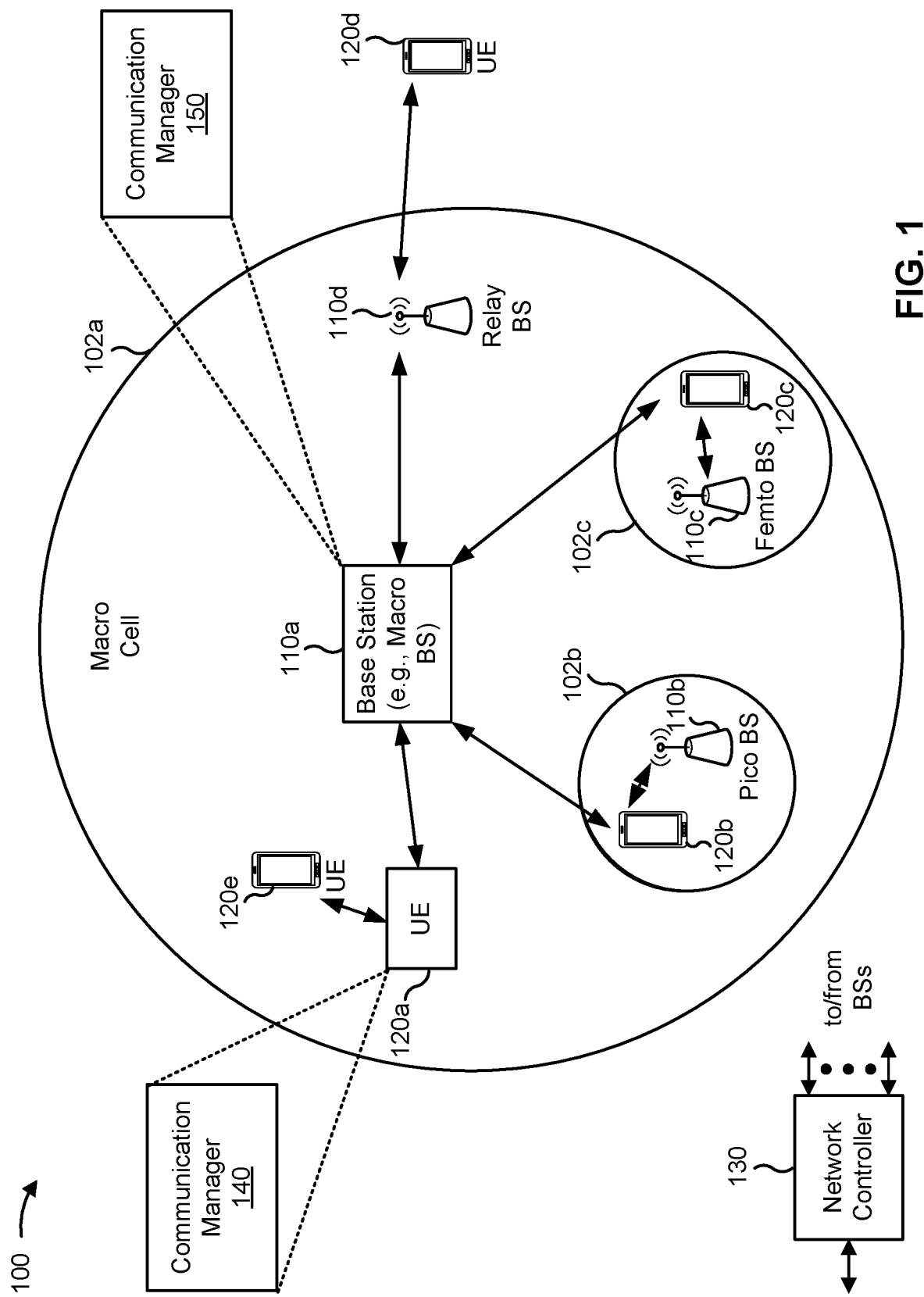
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station having one or more antenna ports, a communication that includes one or more data streams and a tone reservation signal, wherein a number of the one or more antenna ports is different than a number of the one or more data streams; and perform channel estimation based at least in part on the communication. Additionally, or alternatively, the communication manager 140 may perform one or more other operations described herein.

In some aspects, the base station 110 may include a communication manager 150. As described in more detail elsewhere herein, the communication manager 150 may identify a tone reservation signal for one or more data streams; and perform a transmission of a communication, using one or more antenna ports of the base station, that includes the one or more data streams and the tone reservation signal, wherein a number of the one or more antenna ports is different than a number of the one or more data streams. Additionally, or alternatively, the communication manager 150 may perform one or more other operations described herein.

As indicated above, FIG. 1 is provided as an example. Other examples may differ from what is described with regard to FIG. 1.

Figure 2:
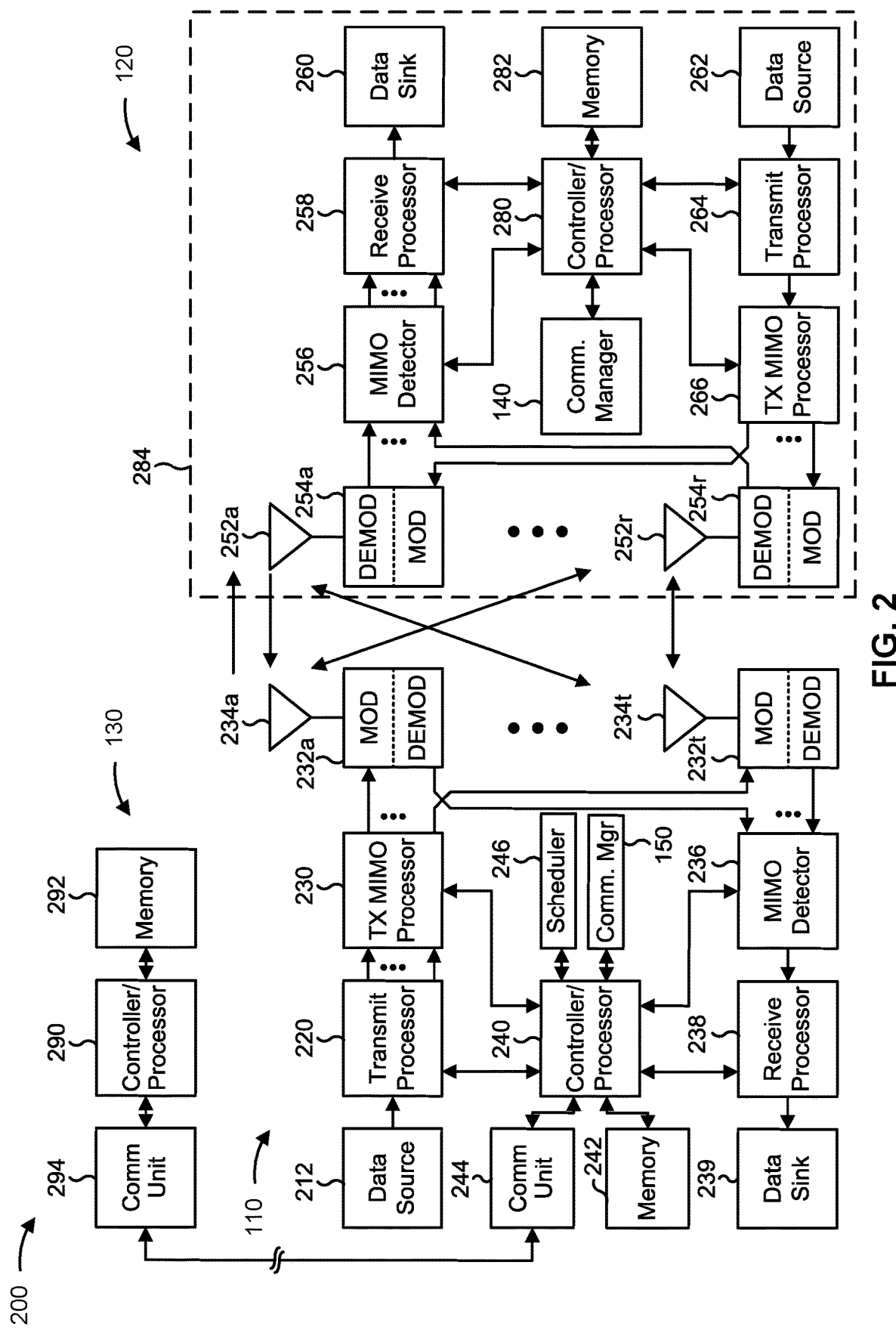
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with tone reservation for digital post distortion, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving, from a base station having one or more antenna ports, a communication that includes one or more data streams and a tone reservation signal, wherein a number of the one or more antenna ports is different than a number of the one or more data streams. The means for the UE to perform the operations may include, for example, one or more of an antenna 252, modem 254, MIMO detector 256, receive processor 258, controller/processor 280, memory 282, or the like. In some aspects, the UE includes means for performing channel estimation based at least in part on the communication. The means for the UE to perform the operations may include, for example, controller/processor 280, memory 282, or the like.

In some aspects, the base station includes means for identifying a tone reservation signal for one or more data streams. The means for the base station to perform the operations may include, for example, controller/processor 240, memory 242, or the like. In some aspects, the base station includes means for performing a transmission of a communication, using one or more antenna ports of the base station, that includes the one or more data streams and the tone reservation signal, wherein a number of the one or more antenna ports is different than a number of the one or more data streams. The means for the base station to perform the operations may include, for example, one or more of controller/processor 240, transmit processor 220, TX MIMO processor 230, modem 232, antenna 234, memory 242, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
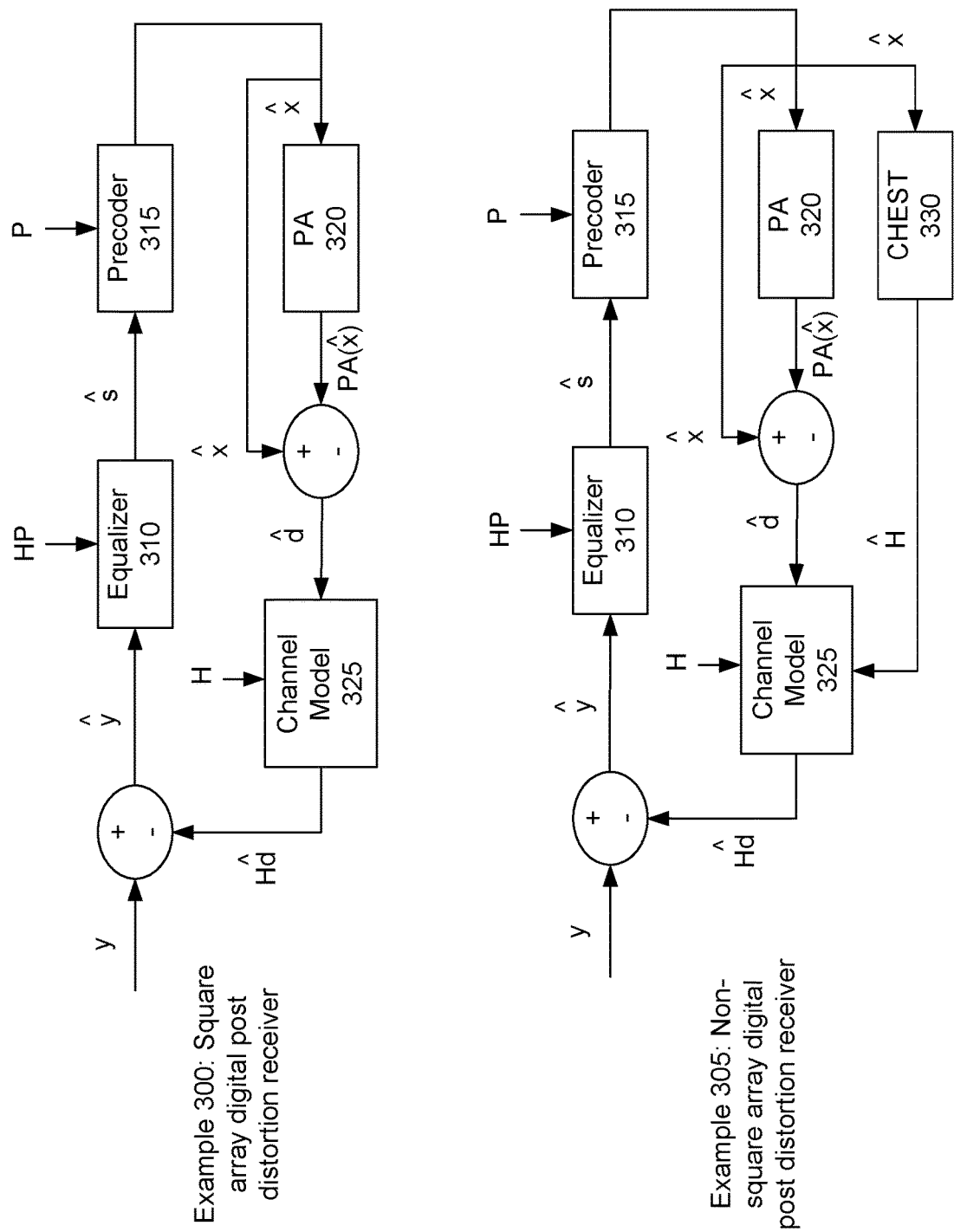
FIG. 3 is a diagram illustrating an example of a digital post distortion receiver, in accordance with the present disclosure.

FIG. 3 is a diagram illustrating examples 300 and 305 of digital post distortion receivers, in accordance with the present disclosure. The digital post distortion receiver 300 may be a square array digital post distortion receiver. The digital post distortion receiver 305 may be a non-square array digital post distortion receiver.

In some communications systems, a transmitter may, as power increases, transmit signals with increasing non-linearity. For example, a high-power amplifier (HPA) with a limited dynamic range (DR) may distort a transmitted signal as a result of a relatively higher peak to average power ratio. The non-linear distortion may be an in-band distortion, which affects link performance in connection with an error vector magnitude (EVM) amount, or out-band distortion, which causes adjacent channel interference (e.g., the transmitted signal interferes with other signals on neighboring frequency bands). To avoid non-linearity and accompanying interference, the transmitter device may apply a power back-off value to reduce transmit power, thereby reducing non-linearity.

However, applying a power back-off value may result in reduced power efficiency (e.g., less available transmit power is used to transmit in a channel, thereby reducing range, signal to interference noise ratio, and/or the like). The transmitter may apply digital pre-distortion processing to reduce non-linear distortion to less than a threshold level with a reduced level of power back-off, thereby increasing power efficiency relative to avoiding non-linear distortion using only a power back-off. However, although digital pre-distortion processing may correct an in-dynamic-range non-linearity affect, non-linearity may still cause a clipping effect (e.g., resulting from the limited dynamic range). This may limit an effectiveness of digital pre-distortion processing and an associated power efficiency benefit of digital pre-distortion processing. Moreover, the use of digital pre-distortion processing may be limited to relatively high transmit power values present at a cell edge and may not be used away from the cell edge.

To account for limitations of digital pre-distortion processing, the receiver may apply digital post distortion processing. Digital post distortion processing may be performed by the digital post distortion receivers 300 and 305, which may include hardware and/or software configured to implement an algorithm configured to remove non-linear noise that is generated by a known model (e.g., power amplifier clipping). In digital post distortion processing, for example, the receiver may account for non-linearity-induced clipping. As a result, digital post distortion processing may be effective both away from and at a cell edge.

In some cases, the square array digital post distortion receiver 300 may include an equalizer 310, a precoder 315, a power amplifier (PA) 320, and a channel model 325. The square array digital post distortion receiver 300 may be configured to perform channel estimation on a signal having a number of data streams that is equal to the number of antennas of the transmitter, as described in more detail below. In some cases, the non-square array digital post distortion receiver 305 may include an equalizer 310, a precoder 315, a PA 320, a channel model 325, and a channel estimation (CHEST) block 330 for estimation of the non-precoded channel (using, e.g., blind channel estimation or data aided channel estimation). The non-square array digital post distortion receiver 305 may be configured to perform channel estimation on a signal having a number of data streams that is different (e.g., less) than the number of antennas of the transmitter, as described in more detail below.

In some cases, the square array digital post distortion receiver 300, or the non-square array digital post distortion receiver 305, may perform channel estimation using the example expectation maximization technique described below. The digital post distortion receiver may perform channel estimation using any channel estimation technique, or a combination of channel estimation techniques.

In some cases, the receiver may perform channel estimation based at least in part on a received communication y. The communication y may be represented as follows:

$$y = H \cdot P \cdot s + n = H \cdot v + n, \text{ where}$$

H is the channel response between the transmitter ports and the receiver ports,
P is the precoding matrix,
s is the transmitted signal at the layer ports,
v is the transmitted signal at the antenna ports, and
n is the additive noise.

In some cases, the receiver may determine a DMRS based channel estimation (e.g., post precoding channel estimation) as follows:

$$\hat{H}_{DMRS} \approx H \cdot P$$

In some cases, the receiver may determine (e.g., using equalization) the transmitted signal at the layer ports as follows:

$$\hat{s} = \min_{s} \left\{ \left\| y - \hat{H}_{DMRS} \cdot s \right\|^2 \right\}$$

In some cases, the receiver may evaluate the transmission antenna port signal by applying the precoding matrix on the estimated transmitted symbol as follows:

$$\hat{v} = P \cdot \hat{s}$$

In some cases, the evaluated transmission antenna port signal may be used to estimate the channel response as follows:

$$\tilde{H} : \| y - \tilde{H} \cdot \hat{v} \|^2 \to 0$$

The estimated channel response may be used to subtract the non-linearities from the received signal. In some aspects, the digital post distortion channel estimation process may be an iterative process. For example, the receiver may use the estimated channel response to perform additional channel estimation (e.g., using the process described above).

As described above, digital post distortion processing may enable a transmitter to perform transmissions that are close to the power amplifier compression point. At the receiver, the non-linearities in the received signal may be reconstructed and subtracted from the received signal. For example, the non-linearities may be reconstructed and subtracted from the received signal in an iterative manner. This may enable the transmitter to transmit at a higher power, thereby improving the system capacity and the signal to noise ratio (SNR) of the communication. However, it may be difficult to implement digital post distortion processing for a communication that involves non-square precoding. In some cases, the DMRS in the communication may be allocated per data stream, making it difficult for the receiver to efficiently track the data stream to each of the transmitter antenna ports, and therefore, to determine the non-linearities in the communication. The receiver may not be able to effectively perform digital post distortion processing when the number of antenna ports at the transmitter is different (e.g., greater) than the number of data streams (e.g., layers) being communicated, and when the data streams of the communication lack orthogonality. For example, the receiver may be able to estimate the non-linearities at the transmitter side, per transmit antenna port (as they may be different per transmit antenna port). However, if the channel from each transmit antenna port, to each receive antenna port, is not known to the receiver, the receiver may not be able to cancel non-linearities from the received signal. Thus, the base station 110 may not be able to transmit at the higher power, and the system capacity, and SNR of the communication, may be reduced.

Techniques and apparatuses are described herein for tone reservation for digital post distortion. In some aspects, a transmitter, such as the base station 110, may identify a tone reservation signal for one or more data streams, and may insert the tone reservation signal into the one or more data streams. For example, the base station 110 may insert the tone reservation signal into the one or more data streams prior to a precoding of the one or more data streams. Alternatively, the base station 110 may insert the tone reservation signal into the communication after a precoding of the one or more data streams. The base station 110 may perform a transmission of a communication, using one or more antenna ports of the base station 110, that includes the one or more data streams and the tone reservation signal. The number of the one or more antenna ports may be different than the number of the one or more data streams. In some aspects, a UE, such as the UE 120, may receive the communication that includes the one or more data streams and the tone reservation signal, and may perform channel estimation based at least in part on the communication.

As described above, digital post distortion processing may enable the base station 110 to perform transmissions that are close to the power amplifier compression point. However, it may be difficult for the receiver to perform digital post distortion processing when the number of antenna ports at the transmitter is different than the number of data streams being communicated, and when the data streams of the communication lack orthogonality. Thus, the base station 110 may not be able to transmit at the higher power, and the capacity and SNR of the communication may be reduced. As described in more detail below, the base station 110 may be configured to insert one or more tone reservation signals into one or more data streams of the transmission, thereby increasing the orthogonality of the data streams. Thus, power efficiency and system capacity may be increased.

As indicated above, FIG. 3 is provided as an example. Other examples may differ from what is described with respect to FIG. 3.

Figure 4:
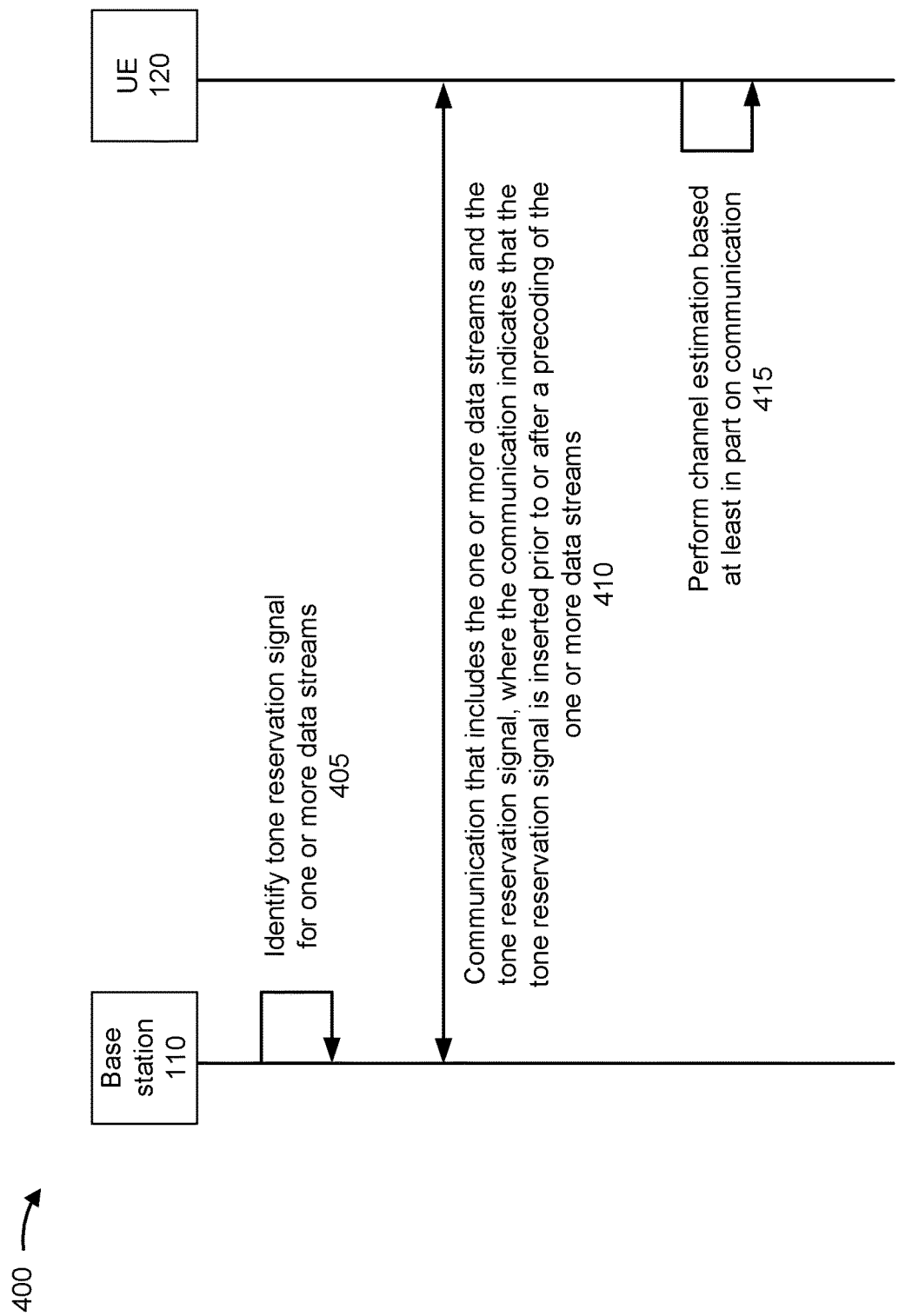
FIG. 4 is a diagram illustrating an example associated with tone reservation for digital post distortion, in accordance with the present disclosure.

FIG. 4 is a diagram illustrating an example 400 of tone reservation for digital post distortion, in accordance with the present disclosure. A base station, such as the base station 110, may communicate with a UE, such as the UE 120.

As shown in connection with reference number 405, the base station 110 may identify a tone reservation signal for one or more data streams. In some aspects, the tone reservation signal may be included in one or more resources (e.g., subcarriers, layers, or OFDM symbols, among other examples) of the data stream. In some aspects, the tone reservation technique may include reserving one or more resources (e.g., subcarriers) that are used to accommodate a signal that improves the orthogonality between the layers, or the signals, at the antenna ports. As described in more detail below, the tone reservation signal may be inserted into the data stream prior to a precoding of the data stream, or after a precoding of the data stream. In the example, that the tone reservation signal is inserted into the data stream prior to the precoding, the reserved subcarriers may be of selected layers, and the tone reservation signal may be defined per selected layer. In the example, that the tone reservation signal is inserted into the data stream after the precoding, the tone reservation signal may be defined per antenna port. In some aspects, the tone reservation signal may be inserted into a single data stream, or into multiple data streams. In some aspects, a data stream may include a single tone reservation signal, multiple tone reservation signals, or no tone reservation signals Additional details regarding the data streams, and the tone reservation signals, are described in connection with FIG. 5.

In some aspects, the base station 110 may insert the tone reservation signal into the one or more data streams prior to a precoding of the one or more data streams. For example, the tone reservation signal may be transmitted with the data signal in an interlaced manner (e.g., such that some of the data resources are occupied in the tone reservation signal and not with data), and the precoding may be applied on the combined signal. In some aspects, the base station 110 may insert the tone reservation signal into the communication after a precoding of the one or more data streams. For example, the tone reservation signal may be combined with the data signal, over the one or more antennas, after the precoding is applied on the data. In this case, for the subcarriers that include the tone reservation signals, no data may be transmitted in that subcarrier.

In some aspects, a tone reservation signal, or multiple tone reservation signals, may be inserted into each of the one or more data streams. For example, the tone reservation signal, or another tone reservation signal, may be inserted into each data stream of a communication having a plurality of data streams.

In some aspects, the tone reservation signal may be inserted into a portion of the one or more data streams. For example, the tone reservation signal, or another tone reservation signal, may be inserted into a portion of the data streams of a communication having a plurality of data streams. The number of data streams in the portion of the data streams may be less than the total number of data streams of the plurality of data streams.

In some aspects, the tone reservation signal may be inserted into a single data stream, or into multiple data streams. In some aspects, each data stream may include a different tone reservation signal. In some aspects, the tone reservation signal may be a single signal that is carried by multiple layers, and the data stream may be a signal that is transmitted over several layers, subcarriers, or OFDM symbols, among other examples. In some aspects, a first portion of the data streams may include a different tone reservation signal than a second portion of the data streams. In some aspects, the tone reservation signal may not be the same value for different subcarriers, for different streams, or for different antennas. Instead, each tone reservation signal may include a different value (e.g., a complex number).

As described above, one or more tone reservation signals may be adaptively inserted into the one or more data streams (e.g., by an encoder of the base station 110) based at least in part on the data being communicated. In some aspects, the base station 110 may insert the tone reservation signal based at least in part on a determination that the data streams are not orthogonal. For example, the base station 110 may determine to insert the tone reservation signal into the one or more data streams to increase the orthogonality between the data streams. Inserting a tone reservation signal into a first one of the data streams, and not into a second one of the data streams, may increase the orthogonality between the data streams. Additionally, or alternatively, inserting a first tone reservation signal into the first data stream, and inserting a second tone reservation signal into the second data stream, may increase the orthogonality between the data streams.

In some aspects, the base station 110 may determine a location of the tone reservation signal in the one or more data streams based at least in part on an inner product between the one or more data streams. In some aspects, the base station 110 may determine a location of the tone reservation signal in the one or more data streams based at least in part on an inner product between the one or more antenna ports.

In some aspects, the base station 110 may randomly insert the tone reservation signal into the one or more data streams. For example, the base station 110 may insert the tone reservation signal in a random location of the data stream, or at an interval in the data stream (e.g., every five symbols, or every ten symbols, among other examples).

As shown in connection with reference number 410, the base station 110 may transmit, and the UE 120 may receive, a communication that includes the one or more data streams and the tone reservation signal. The communication may be transmitted by one or more antenna ports of the base station 110. In some aspects, the base station 110 may include a number of antenna ports. The number of antenna ports for transmitting the data streams may include all of the antenna ports associated with the base station 110, or may include a subset of the antenna ports associated with the base station 110.

As described above, the base station 110 may be configured to perform a precoding operation. The precoding operation for the one or more data streams may be based at least in part on the number of the antenna ports. In some aspects, the number of antenna ports may be different than the number of data streams. For example, the number of antenna ports may be greater than the number of data streams being transmitted. This may be referred to as "non-square" precoding. The precoding matrix in the non-square precoding example may not be invertible. Thus, performing channel estimation generally does not entail inverting the precoder (as may be the case in the case of "square" precoding). In contrast, a "square" precoding operation may refer to a precoding in which the number of antenna ports is equal to the number of data streams being transmitted. The precoding matrix in the square precoding example may be invertible. Thus, the estimation of the precoded channel may be sufficient for determining the non-precoded channel. As such, in "non-square" precoding, other channel estimation methods may be used such as (blind channel estimation of data aided channel estimation), as indicated by block 330 with reference to FIG. 3.

In some aspects, the base station 110 may transmit, and the UE 120 may receive, an indication of a location of the tone reservation signal. For example, the base station 110 may transmit an indication of one or more symbols that include the tone reservation signal. In some aspects, the base station 110 may indicate an orthogonal frequency division multiplexing (OFDM) symbol that includes the tone reservation symbol, a subcarrier that includes the tone reservation signal, and/or a data stream that includes the tone reservation signal. In some aspects, the location of the tone reservation signal may be transmitted via downlink control information (DCI), a medium access control (MAC) control element (CE), or a radio resource control (RRC) message.

In some aspects, the UE 120 may transmit, and the base station 110 may receive, an indication that the UE 120 supports tone reservation signaling Specifically, the UE 120 may indicate that the UE 120 supports digital post distortion tone reservation signaling. In some aspects, the base station 110 may receive the indication that the UE 120 supports tone reservation signaling prior to performing the transmission of the communication that includes the one or more data streams and the tone reservation signal. In some aspects, the indication that the UE 120 supports tone reservation signaling may be transmitted via uplink control information (UCI), a MAC-CE, or an RRC message.

In some aspects, the base station 110 may transmit, and the UE 120 may receive, an indication of a constellation associated with the tone reservation signal. The constellation may be a diagram that represents the tone reservation signal modulated by a digital modulation scheme such as quadrature amplitude modulation (QAM) or phase-shift keying. The constellation may display the tone reservation signal as a two-dimensional xy-plane scatter diagram in the complex plane at symbol sampling instants. The angle of a point, measured counterclockwise from the horizontal axis, may represent the phase shift of the carrier wave from a reference phase, and the distance of the point from the origin may represent a measure of the amplitude or power of the tone reservation signal. In some aspects, the indication of the constellation may be transmitted via DCI, a MAC-CE, or an RRC message.

As shown in connection with reference number 415, the UE 120 may perform channel estimation. As described above, the base station 110 may transmit a communication that becomes distorted, or that becomes mixed with noise, as the communication passes through a medium (e.g., the channel) to reach the UE 120. The UE 120 may need to remove the distortion and/or the noise from the received communication in order to properly decode the communication. In some aspects, to remove (e.g., clean) the non-linear distortion from the input, the estimated non-linear distortion may need to be subtracted, convolved by the non-precoded channel from the received samples. Thus, the non-precoded channel may be estimated (e.g., by the UE 120).

In some aspects, the UE 120 may perform the channel estimation based at least in part on the communication. For example, the UE 120 may receive, from the base station 110, the communication that includes the one or more data streams and the tone reservation signal, and may perform channel estimation based at least in part on the received communication. In some aspects, the UE 120 may perform channel estimation using the tone reservation signals. In some aspects, the UE 120 may be configured to ignore the tone reservation signal when performing the channel estimation. For example, the UE 120 may perform channel estimation based at least in part on the symbols in the communication that do not include the tone reservation signal.

In some aspects, the UE 120 may receive, from the base station 110, an indication of the location of the tone reservation signal. For example, the base station 110 may transmit a separate communication that includes an indication of the location of the tone reservation signal. Additionally, or alternatively, the base station 110 may transmit the indication of the location of the tone reservation signal in the data stream, or as part of the tone reservation signal. In some aspects, the UE 120 may be configured to determine the location of the tone reservation signal in the data stream, with or without receiving an indication from the base station 110 of the location of the tone reservation signal.

In some aspects, the UE 120 may apply a tone reservation matrix to the communication. The tone reservation matrix may be based at least in part on the number of antenna ports and the number of tone reservation signals in the one or more data streams. The tone reservation matrix may be used to remove the tone reservation signals from the received communication. The UE 120 may be configured to perform the channel estimation after applying the tone reservation signal to the communication. In some aspects, performing the channel estimation may include iteratively applying the tone reservation matrix to the received communication.

In some aspects, the UE 120 may evaluate the tone reservation signal to be used as a pilot (e.g., a known signal) for the channel estimation. In the example that the tone reservation signal was inserted prior to the precoding of the data stream, the UE 120 may perform channel estimation by a direct estimation of the tone reservation signal (e.g., using equalization of the tone reservation signal, or considering the constellation of the tone reservation signal, among other examples). In the example that the tone reservation signal was inserted after precoding of the data stream, the UE 120 may evaluate the tone reservation signal from the precoded data (e.g., by applying the same calculation of the tone reservation as done by the base station 110 using the estimated data).

As described above, digital post distortion processing may enable the base station 110 to perform transmissions that are close to the power amplifier compression point. However, it may be difficult for the receiver to perform digital post distortion processing when the number of antenna ports at the transmitter is different than the number of data streams being communicated, and when the data streams of the communication lack orthogonality. Thus, the base station 110 may be configured to insert one or more tone reservation signals into one or more data streams of the transmission, thereby increasing the orthogonality of the data streams. Thus, power efficiency and system capacity may be increased.

Although FIG. 4 describes an example of the base station 110 transmitting data streams having tone reservation signals, this functionality may additionally, or alternatively, be implemented by the UE 120. For example, the UE 120 may be configured to identify, determine, or generate a tone reservation signal, insert the tone reservation signal into one or more data streams, and transmit a communication (e.g., an uplink communication to the base station 110) that includes the one or more data streams and the tone reservation signal.

As indicated above, FIG. 4 is provided as an example. Other examples may differ from what is described with respect to FIG. 4.

Figure 5:
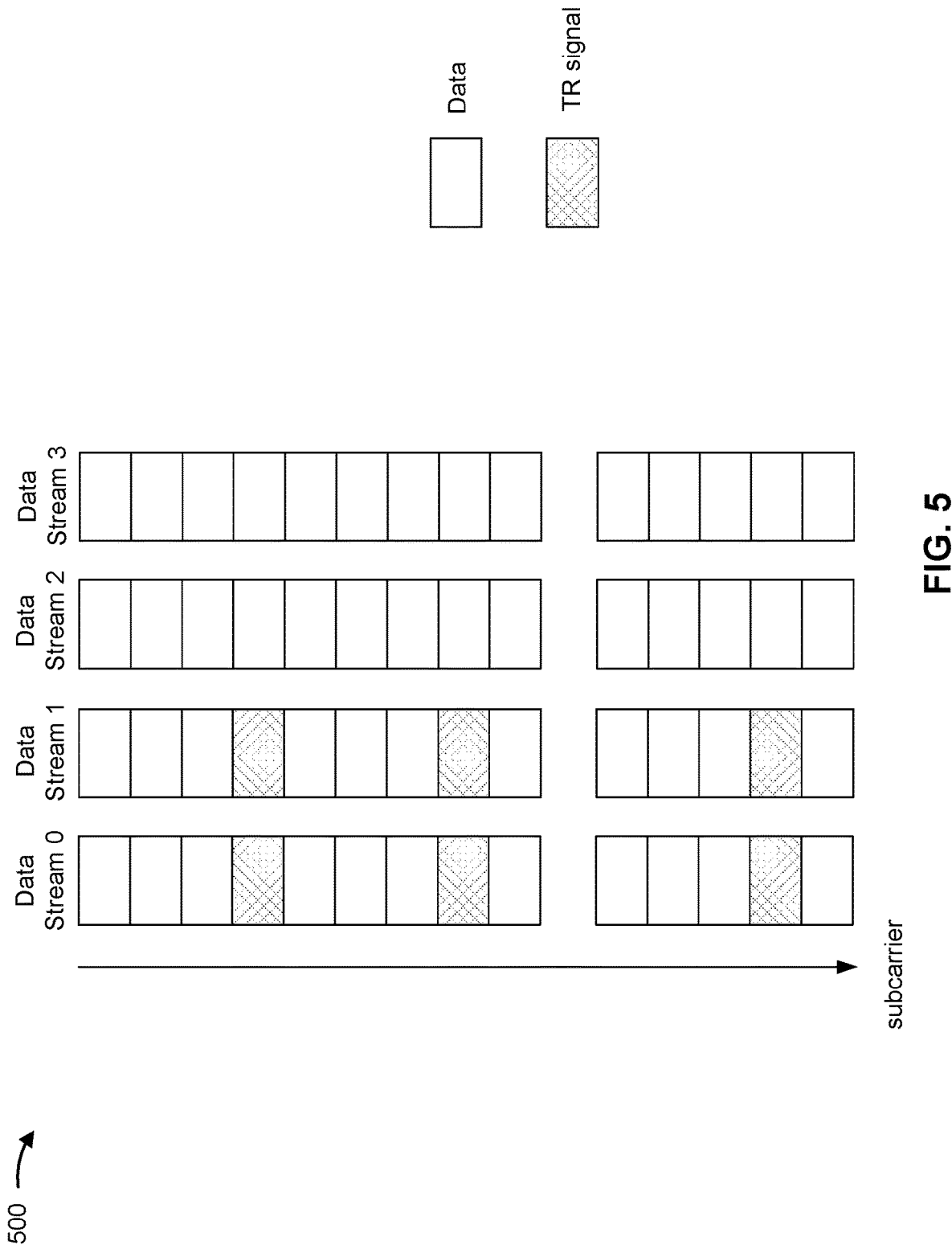
FIG. 5 is a diagram illustrating an example associated with data streams and tone reservation signals, in accordance with the present disclosure.

FIG. 5 is a diagram illustrating an example 500 of data streams and tone reservation signals, in accordance with the present disclosure. An example communication may include four data streams, shown in the example 500 as data stream 0, data stream 1, data stream 2, and data stream 3. Each of the data streams may include a plurality of symbols. One or more of the symbols may be configured with a tone reservation signal.

In some aspects, a tone reservation signal may be inserted into a portion of the one or more data streams. The number of data streams in the portion of the data streams may be less than the total number of data streams of the plurality of data streams of the communication. In some aspects, a tone reservation signal may be inserted into each data stream of the portion of the data streams, and each data stream of the portion of the data streams may have different tone reservation signals. For example, data stream 0 may have tone reservation signals A and B, data stream 1 may have tone reservation signals C and D, while data stream 2 and data stream 3 do not have any tone reservation signals. In some aspects, a tone reservation signal may be inserted into each data stream of the portion of the data streams, and each data stream of the portion of the data streams may have the same tone reservation signal. For example, data stream 0 may have tone reservation signals A and B, data stream 1 may have tone reservation signals A and B, while data stream 2 and data stream 3 do not have any tone reservation signals.

In some aspects, a tone reservation signal may be inserted into each of the one or more data streams. For example, the tone reservation signal may be inserted into each data stream of a communication having a plurality of data streams. In some aspects, the tone reservation signals in each of the plurality of data streams may be different. For example, data stream 0 may have tone reservation signals A and B, data stream 1 may have tone reservation signals C and D, data stream 2 may have tone reservation signal E, and data stream 3 may have done reservation signal F. In some aspects, one or more of the data streams may have the same tone reservation signal, and one or more of the data streams may have different tone reservation signals. For example, data stream 0 may have tone reservation signals A and B, data stream 1 may have tone reservation signals A and B, data stream 2 may have tone reservation signal C, and data stream 3 may have done reservation signal C.

As indicated above, FIG. 5 is provided as an example. Other examples may differ from what is described with respect to FIG. 5.

Figure 6:
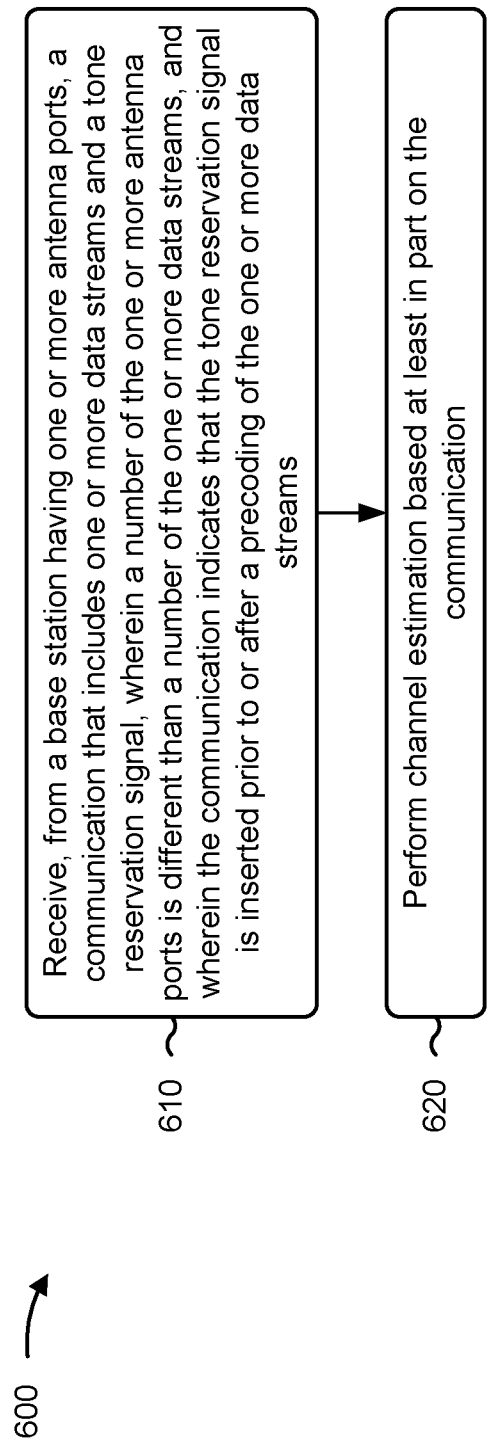
FIG. 6 is a diagram illustrating an example process associated with tone reservation for digital post distortion, in accordance with the present disclosure.

FIG. 6 is a diagram illustrating an example process 600 performed, for example, by a UE, in accordance with the present disclosure. Example process 600 is an example where the UE (e.g., UE 120) performs operations associated with tone reservation for digital post distortion.

As shown in FIG. 6, in some aspects, process 600 may include receiving, from a base station having one or more antenna ports, a communication that includes one or more data streams and a tone reservation signal, wherein a number of the one or more antenna ports is different than a number of the one or more data streams (block 610). For example, the UE (e.g., using communication manager 140 and/or reception component 802, depicted in FIG. 8) may receive, from a base station having one or more antenna ports, a communication that includes one or more data streams and a tone reservation signal, wherein a number of the one or more antenna ports is different than a number of the one or more data streams, as described above, for example, with reference to FIG. 4 and/or FIG. 5.

As further shown in FIG. 6, in some aspects, process 600 may include performing channel estimation based at least in part on the communication (block 620). For example, the UE (e.g., using communication manager 140 and/or channel estimation component 808, depicted in FIG. 8) may perform channel estimation based at least in part on the communication, as described above, for example, with reference to FIG. 4 and/or FIG. 5.

Process 600 may include additional aspects, such as any single aspect or any combination of aspects described below and/or in connection with one or more other processes described elsewhere herein.

In a first aspect, the communication indicates that the tone reservation signal was inserted into the one or more data streams prior to a precoding of the one or more data streams.

In a second aspect, alone or in combination with the first aspect, the communication indicates that the tone reservation signal was inserted into the communication after a precoding of the one or more data streams.

In a third aspect, alone or in combination with one or more of the first and second aspects, process 600 includes transmitting, to the base station, an indication that the UE supports digital post distortion tone reservation signaling.

In a fourth aspect, alone or in combination with one or more of the first through third aspects, process 600 includes receiving, from the base station, an indication of a location of the tone reservation signal.

In a fifth aspect, alone or in combination with one or more of the first through fourth aspects, the indication of the location of the tone reservation signal indicates an OFDM symbol, a subcarrier, or a data stream that includes the tone reservation signal.

In a sixth aspect, alone or in combination with one or more of the first through fifth aspects, receiving the indication of the location of the tone reservation signal comprises receiving the indication via downlink control information, a medium access control message, or a radio resource control message.

In a seventh aspect, alone or in combination with one or more of the first through sixth aspects, process 600 includes receiving, from the base station, an indication of a constellation associated with the tone reservation signal.

In an eighth aspect, alone or in combination with one or more of the first through seventh aspects, each data stream, of the one or more data streams, includes the tone reservation signal or a different tone reservation signal.

In a ninth aspect, alone or in combination with one or more of the first through eighth aspects, a portion of the one or more data streams includes the tone reservation signal or a different tone reservation signal, wherein the portion of the one or more data streams is less than a total number of the one or more data streams.

In a tenth aspect, alone or in combination with one or more of the first through ninth aspects, performing the channel estimation based at least in part on the communication comprises performing the channel estimation using one or more symbols that do not include the tone reservation signal.

In an eleventh aspect, alone or in combination with one or more of the first through tenth aspects, the number of the one or more antenna ports is greater than the number of the one or more data streams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
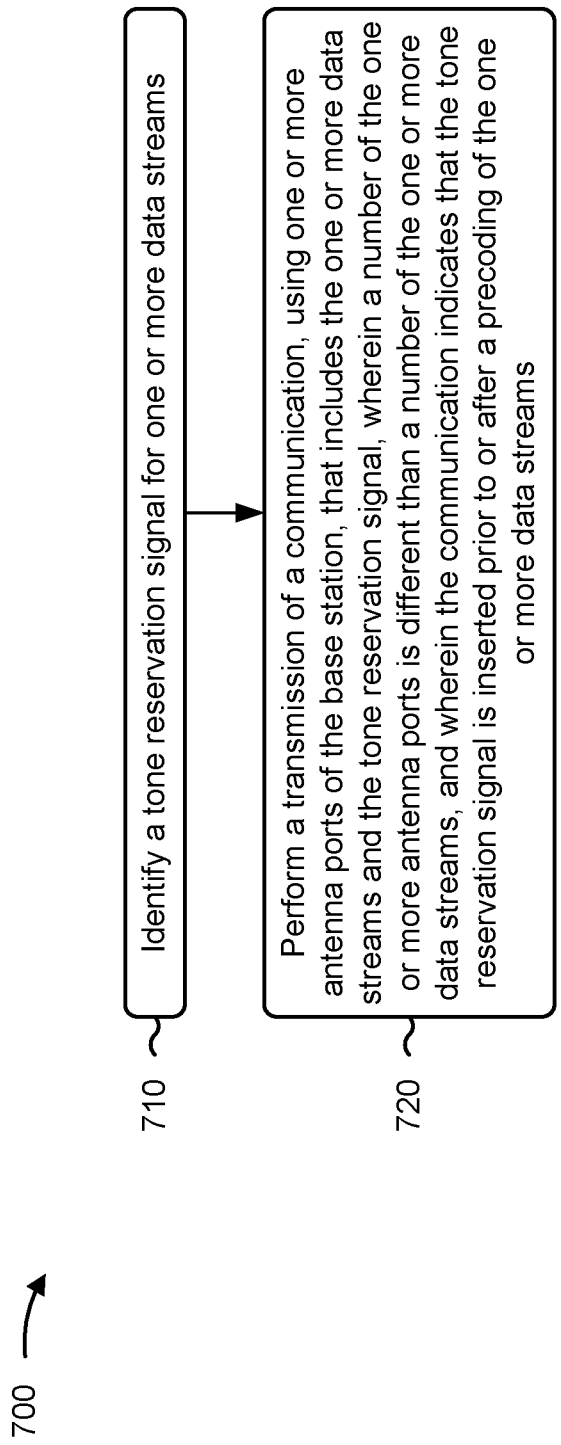
FIG. 7 is a diagram illustrating an example process associated with tone reservation for digital post distortion, in accordance with the present disclosure.

FIG. 7 is a diagram illustrating an example process 700 performed, for example, by a base station, in accordance with the present disclosure. Example process 700 is an example where the base station (e.g., base station 110) performs operations associated with tone reservation for digital post distortion.

As shown in FIG. 7, in some aspects, process 700 may include identifying a tone reservation signal for one or more data streams (block 710). For example, the base station (e.g., using communication manager 150 and/or identification component 908, depicted in FIG. 9) may identify a tone reservation signal for one or more data streams, as described above, for example, with reference to FIG. 4 and/or FIG. 5.

As further shown in FIG. 7, in some aspects, process 700 may include performing a transmission of a communication, using one or more antenna ports of the base station, that includes the one or more data streams and the tone reservation signal, wherein a number of the one or more antenna ports is different than a number of the one or more data streams (block 720). For example, the base station (e.g., using communication manager 150 and/or transmission component 904, depicted in FIG. 9) may perform a transmission of a communication, using one or more antenna ports of the base station, that includes the one or more data streams and the tone reservation signal, wherein a number of the one or more antenna ports is different than a number of the one or more data streams, as described above, for example, with reference to FIG. 4 and/or FIG. 5.

Process 700 may include additional aspects, such as any single aspect or any combination of aspects described below and/or in connection with one or more other processes described elsewhere herein.

In a first aspect, process 700 includes inserting the tone reservation signal into the one or more data streams prior to a precoding of the one or more data streams.

In a second aspect, alone or in combination with the first aspect, process 700 includes inserting the tone reservation signal into the communication after a precoding of the one or more data streams.

In a third aspect, alone or in combination with one or more of the first and second aspects, process 700 includes performing a precoding of the communication using a non-rectangular precoding matrix.

In a fourth aspect, alone or in combination with one or more of the first through third aspects, process 700 includes receiving, from a UE, an indication that the UE supports digital post distortion tone reservation signaling.

In a fifth aspect, alone or in combination with one or more of the first through fourth aspects, process 700 includes transmitting, to a user equipment, an indication of a location of the tone reservation signal.

In a sixth aspect, alone or in combination with one or more of the first through fifth aspects, the indication of the location of the tone reservation signal indicates an OFDM symbol, a subcarrier, or a data stream that includes the tone reservation signal.

In a seventh aspect, alone or in combination with one or more of the first through sixth aspects, transmitting the indication of the location of the tone reservation signal comprises transmitting the indication via downlink control information, a medium access control message, or a radio resource control message.

In an eighth aspect, alone or in combination with one or more of the first through seventh aspects, process 700 includes transmitting, to a user equipment, an indication of a constellation associated with the tone reservation signal.

In a ninth aspect, alone or in combination with one or more of the first through eighth aspects, process 700 includes inserting the tone reservation signal into each of the one or more data streams.

In a tenth aspect, alone or in combination with one or more of the first through ninth aspects, process 700 includes inserting the tone reservation signal into a portion of the one or more data streams, wherein the portion of the one or more data streams is less than a total number of the one or more data streams.

In an eleventh aspect, alone or in combination with one or more of the first through tenth aspects, the number of the one or more antenna ports is greater than the number of the one or more data streams.

In a twelfth aspect, alone or in combination with one or more of the first through eleventh aspects, process 700 includes determining a location of the tone reservation signal based at least in part on an inner product between the one or more data streams, or an inner product between the one or more antenna ports.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
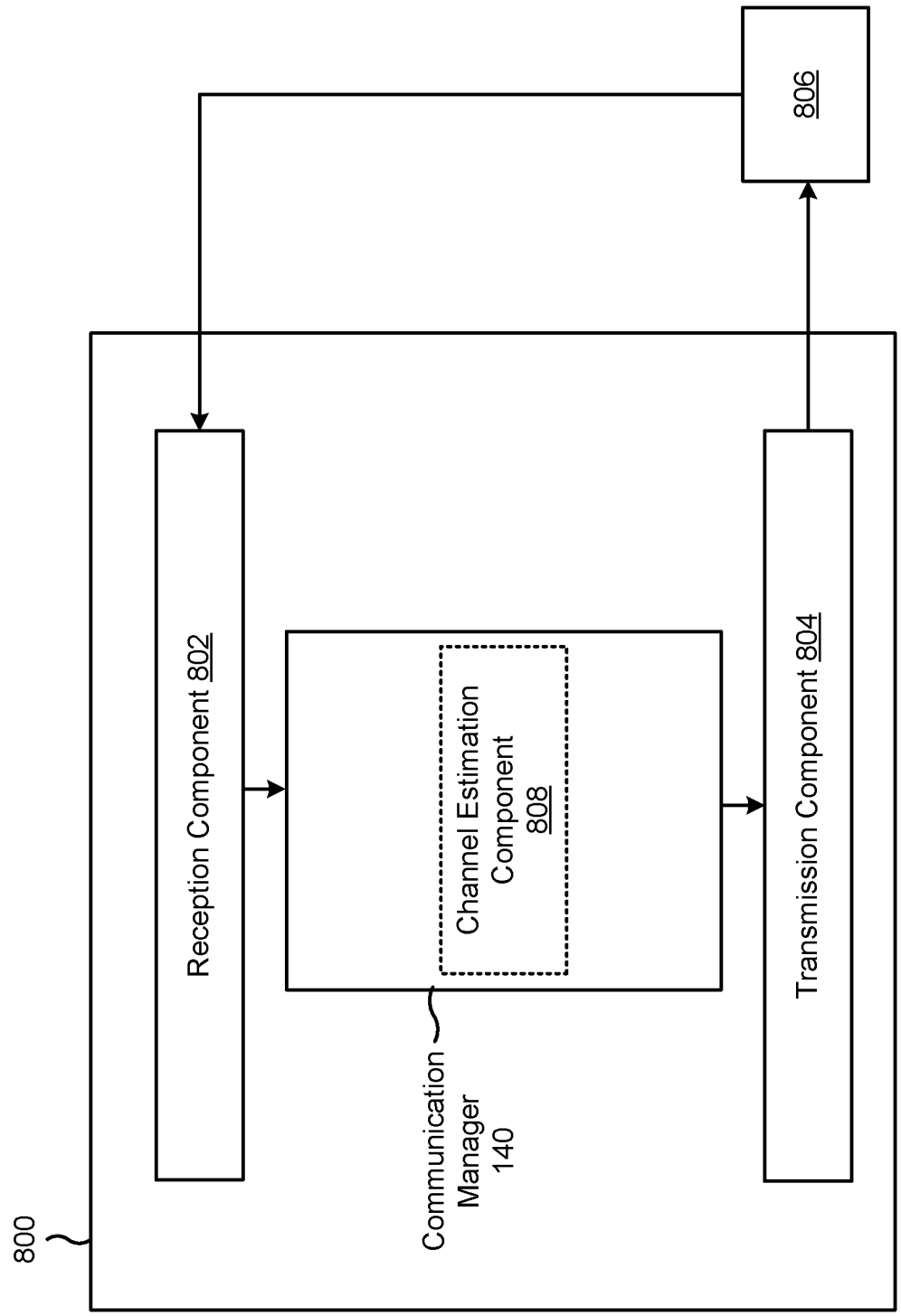
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a channel estimation component 808, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a transceiver, a memory, or a combination thereof, of the UE described in connection with FIG. 2. In some aspects, one or more processors may be coupled to the transceiver, and one or more communications may be received by the one or more processors via the transceiver. For example, the apparatus 800 may include a memory, a transceiver, and one or more processors, coupled to the memory and the transceiver, configured to receive, from a base station having one or more antenna ports via the transceiver, a communication that includes one or more data streams and a tone reservation signal, wherein a number of the one or more antenna ports is different than a number of the one or more data streams; and perform channel estimation based at least in part on the communication.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a transceiver, a memory, or a combination thereof, of the UE described in connection with FIG. 2. In some aspects, the transmission component 804 may be co-located with the reception component 802 in a transceiver.

The reception component 802 may receive, from a base station having one or more antenna ports, a communication that includes one or more data streams and a tone reservation signal, wherein a number of the one or more antenna ports is different than a number of the one or more data streams. The channel estimation component 808 may perform channel estimation based at least in part on the communication.

The transmission component 804 may transmit, to the base station via the transceiver, an indication that the UE supports digital post distortion tone reservation signaling.

The reception component 802 may receive, from the base station via the transceiver, an indication of a location of the tone reservation signal.

The reception component 802 may receive, from the base station via the transceiver, an indication of a constellation associated with the tone reservation signal.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
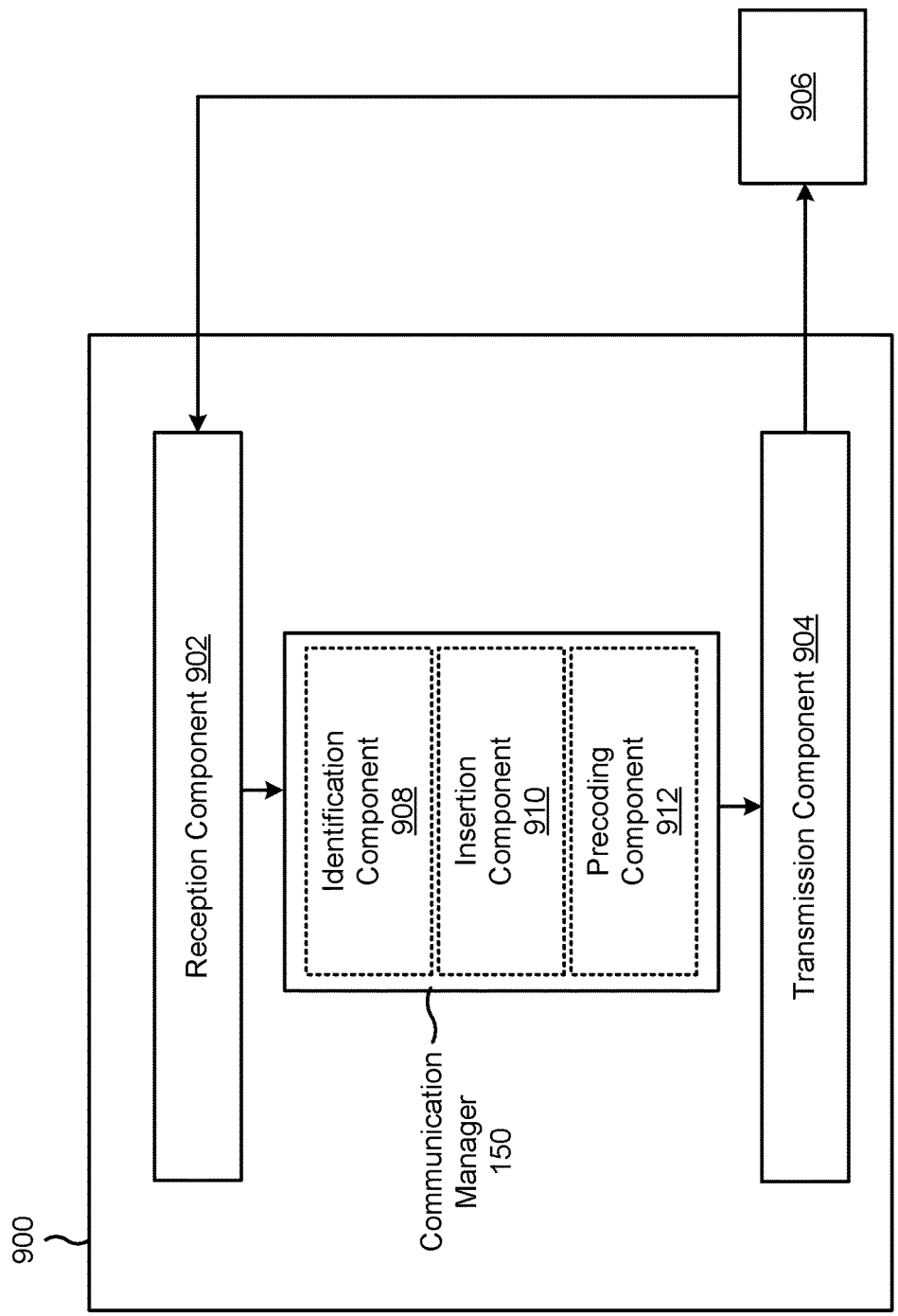
FIG. 9 is a diagram of an example apparatus for wireless communication, in accordance with the present disclosure.

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an identification component 908, an insertion component 910, or a precoding component 912, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The identification component 908 may identify a tone reservation signal for one or more data streams. The transmission component 904 may perform a transmission of a communication, using one or more antenna ports of the base station, that includes the one or more data streams and the tone reservation signal, wherein a number of the one or more antenna ports is different than a number of the one or more data streams.

The insertion component 910 may insert the tone reservation signal into the one or more data streams prior to a precoding of the one or more data streams.

The insertion component 910 may insert the tone reservation signal into the communication after a precoding of the one or more data streams.

The precoding component 912 may perform a precoding of the communication using a non-rectangular precoding matrix.

The reception component 902 may receive, from a UE, an indication that the UE supports digital post distortion tone reservation signaling.

The transmission component 904 may transmit, to a user equipment, an indication of a location of the tone reservation signal.

The transmission component 904 may transmit, to a user equipment, an indication of a constellation associated with the tone reservation signal.

The insertion component 910 may insert the tone reservation signal into each of the one or more data streams.

The insertion component 910 may insert the tone reservation signal into a portion of the one or more data streams, wherein the portion of the one or more data streams is less than a total number of the one or more data streams.

The identification component 908 may determine a location of the tone reservation signal based at least in part on an inner product between the one or more data streams, or an inner product between the one or more antenna ports.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a base station having one or more antenna ports, a communication that includes one or more data streams and a tone reservation signal, wherein a number of the one or more antenna ports is different than a number of the one or more data streams; and performing channel estimation based at least in part on the communication.

Aspect 2: The method of Aspect 1, wherein the communication indicates that the tone reservation signal was inserted into the one or more data streams prior to a precoding of the one or more data streams.

Aspect 3: The method of any of Aspects 1-2, wherein the communication indicates that the tone reservation signal was inserted into the communication after a precoding of the one or more data streams.

Aspect 4: The method of any of Aspects 1-3, further comprising transmitting, to the base station, an indication that the UE supports digital post distortion tone reservation signaling.

Aspect 5: The method of any of Aspects 1-4, further comprising receiving, from the base station, an indication of a location of the tone reservation signal.

Aspect 6: The method of Aspect 5, wherein the indication of the location of the tone reservation signal indicates an orthogonal frequency division multiplexing (OFDM) symbol, a subcarrier, or a data stream that includes the tone reservation signal.

Aspect 7: The method of Aspect 5, wherein receiving the indication of the location of the tone reservation signal comprises receiving the indication via downlink control information, a medium access control message, or a radio resource control message.

Aspect 8: The method of any of Aspects 1-7, further comprising receiving, from the base station, an indication of a constellation associated with the tone reservation signal.

Aspect 9: The method of any of Aspects 1-8, wherein each data stream, of the one or more data streams, includes the tone reservation signal or a different tone reservation signal.

Aspect 10: The method of any of Aspects 1-9, wherein a portion of the one or more data streams includes the tone reservation signal or a different tone reservation signal, wherein the portion of the one or more data streams is less than a total number of the one or more data streams.

Aspect 11: The method of any of Aspects 1-10, wherein performing the channel estimation based at least in part on the communication comprises performing the channel estimation using one or more symbols that do not include the tone reservation signal.

Aspect 12: The method of any of Aspects 1-11, wherein the number of the one or more antenna ports is greater than the number of the one or more data streams.

Aspect 13: A method of wireless communication performed by a base station, comprising: identifying a tone reservation signal for one or more data streams; and performing a transmission of a communication, using one or more antenna ports of the base station, that includes the one or more data streams and the tone reservation signal, wherein a number of the one or more antenna ports is different than a number of the one or more data streams.

Aspect 14: The method of Aspect 13, further comprising inserting the tone reservation signal into the one or more data streams prior to a precoding of the one or more data streams.

Aspect 15: The method of any of Aspects 13-14, further comprising inserting the tone reservation signal into the communication after a precoding of the one or more data streams.

Aspect 16: The method of any of Aspects 13-15, further comprising performing a precoding of the communication using a non-rectangular precoding matrix.

Aspect 17: The method of any of Aspects 13-16, further comprising receiving, from a user equipment (UE), an indication that the UE supports digital post distortion tone reservation signaling.

Aspect 18: The method of any of Aspects 13-17, further comprising transmitting, to a user equipment, an indication of a location of the tone reservation signal.

Aspect 19: The method of Aspect 18, wherein the indication of the location of the tone reservation signal indicates an orthogonal frequency division multiplexing (OFDM) symbol, a subcarrier, or a data stream that includes the tone reservation signal.

Aspect 20: The method of Aspect 18, wherein transmitting the indication of the location of the tone reservation signal comprises transmitting the indication via downlink control information, a medium access control message, or a radio resource control message.

Aspect 21: The method of any of Aspects 13-20, further comprising transmitting, to a user equipment, an indication of a constellation associated with the tone reservation signal.

Aspect 22: The method of any of Aspects 13-21, further comprising inserting the tone reservation signal into each of the one or more data streams.

Aspect 23: The method of any of Aspects 13-22, further comprising inserting the tone reservation signal into a portion of the one or more data streams, wherein the portion of the one or more data streams is less than a total number of the one or more data streams.

Aspect 24: The method of any of Aspects 13-23, wherein the number of the one or more antenna ports is greater than the number of the one or more data streams.

Aspect 25: The method of any of Aspects 13-24, further comprising determining a location of the tone reservation signal based at least in part on an inner product between the one or more data streams, or an inner product between the one or more antenna ports.

Aspect 26: An apparatus for wireless communication at a device, comprising a processor; memory coupled with the processor; and instructions stored in the memory and executable by the processor to cause the apparatus to perform the method of one or more of Aspects 1-12.

Aspect 27: A device for wireless communication, comprising a memory and one or more processors coupled to the memory, the one or more processors configured to perform the method of one or more of Aspects 1-12.

Aspect 28: An apparatus for wireless communication, comprising at least one means for performing the method of one or more of Aspects 1-12.

Aspect 29: A non-transitory computer-readable medium storing code for wireless communication, the code comprising instructions executable by a processor to perform the method of one or more of Aspects 1-12.

Aspect 30: A non-transitory computer-readable medium storing a set of instructions for wireless communication, the set of instructions comprising one or more instructions that, when executed by one or more processors of a device, cause the device to perform the method of one or more of Aspects 1-12.

Aspect 31: An apparatus for wireless communication at a device, comprising a processor; memory coupled with the processor; and instructions stored in the memory and executable by the processor to cause the apparatus to perform the method of one or more of Aspects 13-25.

Aspect 32: A device for wireless communication, comprising a memory and one or more processors coupled to the memory, the one or more processors configured to perform the method of one or more of Aspects 13-25.

Aspect 33: An apparatus for wireless communication, comprising at least one means for performing the method of one or more of Aspects 13-25.

Aspect 34: A non-transitory computer-readable medium storing code for wireless communication, the code comprising instructions executable by a processor to perform the method of one or more of Aspects 13-25.

Aspect 35: A non-transitory computer-readable medium storing a set of instructions for wireless communication, the set of instructions comprising one or more instructions that, when executed by one or more processors of a device, cause the device to perform the method of one or more of Aspects 13-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory;
    a transceiver; and
    one or more processors, coupled to the memory and the transceiver, configured to:
        receive, from a base station having one or more antenna ports via the transceiver, a communication that includes one or more data streams and a tone reservation signal, wherein a number of the one or more antenna ports is different than a number of the one or more data streams, and wherein the communication indicates that the tone reservation signal is inserted prior to or after a precoding of the one or more data streams; and
        perform channel estimation based at least in part on the communication.

2. The apparatus of claim 1, wherein the communication indicates that the tone reservation signal was inserted into the one or more data streams prior to the precoding of the one or more data streams.

3. The apparatus of claim 1, wherein the communication indicates that the tone reservation signal was inserted into the communication after the precoding of the one or more data streams.

4. The apparatus of claim 1, wherein the one or more processors are further configured to transmit, to the base station via the transceiver, an indication that the UE supports digital post distortion tone reservation signaling.

5. The apparatus of claim 1, wherein the one or more processors are further configured to receive, from the base station via the transceiver, an indication of a location of the tone reservation signal.

6. The apparatus of claim 5, wherein the indication of the location of the tone reservation signal indicates an orthogonal frequency division multiplexing (OFDM) symbol, a subcarrier, or a data stream that includes the tone reservation signal.

7. The apparatus of claim 5, wherein the one or more processors configured to receive the indication of the location of the tone reservation signal are further configured to receive the indication via downlink control information, a medium access control message, or a radio resource control message.

8. The apparatus of claim 1, wherein the one or more processors are further configured to receive, from the base station via the transceiver, an indication of a constellation associated with the tone reservation signal.

9. The apparatus of claim 1, wherein each data stream, of the one or more data streams, includes the tone reservation signal or a different tone reservation signal.

10. The apparatus of claim 1, wherein a portion of the one or more data streams includes the tone reservation signal or a different tone reservation signal, wherein the portion of the one or more data streams is less than a total of the one or more data streams.

11. The apparatus of claim 1, wherein the number of the one or more antenna ports is greater than the number of the one or more data streams.

12. An apparatus for wireless communication at a base station, comprising:
   a memory; and
   one or more processors, coupled to the memory, configured to:
      identify a tone reservation signal for one or more data streams; and
      perform a transmission of a communication, using one or more antenna ports of the base station, that includes the one or more data streams and the tone reservation signal, wherein a number of the one or more antenna ports is different than a number of the one or more data streams, and wherein the communication indicates that the tone reservation signal is inserted prior to or after a precoding of the one or more data streams.

13. The apparatus of claim 12, wherein the one or more processors are further configured to insert the tone reservation signal into the one or more data streams prior to the precoding of the one or more data streams.

14. The apparatus of claim 12, wherein the one or more processors are further configured to insert the tone reservation signal into the communication after the precoding of the one or more data streams.

15. The apparatus of claim 12, wherein the one or more processors are further configured to perform the precoding of the communication using a non-rectangular precoding matrix.

16. The apparatus of claim 12, wherein the one or more processors are further configured to receive, from a user equipment (UE), an indication that the UE supports digital post distortion tone reservation signaling.

17. The apparatus of claim 12, wherein the one or more processors are further configured to transmit, to a user equipment, an indication of a location of the tone reservation signal.

18. The apparatus of claim 12, wherein the one or more processors are further configured to transmit, to a user equipment, an indication of a constellation associated with the tone reservation signal.

19. The apparatus of claim 12, wherein the one or more processors are further configured to insert the tone reservation signal into each of the one or more data streams.

20. The apparatus of claim 12, wherein the one or more processors are further configured to insert the tone reservation signal into a portion of the one or more data streams, wherein the portion of the one or more data streams is less than a total of the one or more data streams.

21. A method of wireless communication performed by a user equipment (UE), comprising:
   receiving, from a base station having one or more antenna ports, a communication that includes one or more data streams and a tone reservation signal, wherein a number of the one or more antenna ports is different than a number of the one or more data streams, and wherein the communication indicates that the tone reservation signal is inserted prior to or after a precoding of the one or more data stream; and
   performing channel estimation based at least in part on the communication.

22. The method of claim 21, wherein the communication indicates that the tone reservation signal was inserted into the one or more data streams prior to the precoding of the one or more data streams.

23. The method of claim 21, wherein the communication indicates that the tone reservation signal was inserted into the communication after the precoding of the one or more data streams.

24. The method of claim 21, further comprising transmitting, to the base station, an indication that the UE supports digital post distortion tone reservation signaling.

25. The method of claim 21, further comprising receiving, from the base station, an indication of a location of the tone reservation signal.

26. A method of wireless communication performed by a base station, comprising:
   identifying a tone reservation signal for one or more data streams; and
   performing a transmission of a communication, using one or more antenna ports of the base station, that includes the one or more data streams and the tone reservation signal, wherein a number of the one or more antenna ports is different than a number of the one or more data streams, and wherein the communication indicates that the tone reservation signal is inserted prior to or after a precoding of the one or more data stream.

27. The method of claim 26, further comprising inserting the tone reservation signal into the one or more data streams prior to the precoding of the one or more data streams.

28. The method of claim 26, further comprising inserting the tone reservation signal into the communication after the precoding of the one or more data streams.

29. The method of claim 26, further comprising performing the precoding of the communication using a non-rectangular precoding matrix.

30. The method of claim 26, further comprising receiving, from a user equipment (UE), an indication that the UE supports digital post distortion tone reservation signaling.

* * * * *